(12) United States Patent
Kaliannan et al.

(10) Patent No.: US 8,549,223 B1
(45) Date of Patent: Oct. 1, 2013

(54) SYSTEMS AND METHODS FOR RECLAIMING STORAGE SPACE ON STRIPED VOLUMES

(75) Inventors: Kirubakaran Kaliannan, Beaverton, OR (US); Michael E. Root, San Jose, CA (US)

(73) Assignee: Symantec Corporation, Mountain View, CA (US)

( * ) Notice: Subject to any disclaimer, the term of this patent is extended or adjusted under 35 U.S.C. 154(b) by 545 days.

(21) Appl. No.: 12/608,740

(22) Filed: Oct. 29, 2009

(51) Int. Cl.
*G06F 12/00* (2006.01)
*G06F 13/00* (2006.01)
*G06F 13/28* (2006.01)

(52) U.S. Cl.
USPC .......................................................... 711/114

(58) Field of Classification Search
None
See application file for complete search history.

(56) References Cited

U.S. PATENT DOCUMENTS

| | | | |
|---|---|---|---|
| 5,915,094 A * | 6/1999 | Kouloheris et al. | 709/219 |
| 5,933,834 A * | 8/1999 | Aichelen | 348/E5.008 |
| 6,952,757 B2 | 10/2005 | Carlson et al. | |
| 7,386,663 B2 * | 6/2008 | Cousins | 711/114 |
| 2003/0177379 A1 | 9/2003 | Hori et al. | |
| 2007/0030734 A1 | 2/2007 | Sinclair et al. | |
| 2008/0126734 A1 * | 5/2008 | Murase | 711/170 |
| 2009/0077327 A1 | 3/2009 | Hara | |
| 2009/0089516 A1 | 4/2009 | Pelts et al. | |
| 2011/0078496 A1 * | 3/2011 | Jeddeloh | 714/6.24 |

OTHER PUBLICATIONS

Kirubakaran Kaliannan, et al.; Systems and Methods for Reclaiming Storage Space from Deleted Volumes on Thin-Provisioned Disks; U.S. Appl. No. 12/608,766, filed Oct. 29, 2009.

\* cited by examiner

*Primary Examiner* — Matthew Bradley
*Assistant Examiner* — Craig Goldschmidt
(74) *Attorney, Agent, or Firm* — ALG Intellectual Property, LLC

(57) ABSTRACT

A computer-implemented method for reclaiming storage space on striped volumes may include: 1) identifying a volume striped across a set of storage devices, 2) identifying a reclamation request to reclaim storage space allocated to the striped volume and then, for at least one device in the set of storage devices, 3) identifying stripes of storage on the device that are covered by the reclamation request, 4) creating a consolidated reclamation request for the device that identifies each stripe of storage on the device that is covered by the reclamation request, and then 5) issuing the consolidated reclamation request to the device. Various other methods, systems, and computer-readable media are also disclosed.

20 Claims, 6 Drawing Sheets

SYSTEMS AND METHODS FOR RECLAIMING STORAGE SPACE ON STRIPED VOLUMES

BACKGROUND

Organizations with high volumes of data have long sought to maximize data storage performance while minimizing the cost of storage. Because of this, some organizations have employed striped volumes in an attempt to improve input/output performance. Striping a volume across multiple disks may improve input/output performance by distributing input/output requests across the multiple disks.

Unfortunately, striped volumes may handle certain operations inefficiently. For example, when reclaiming storage space from certain striped volumes, a single storage reclamation request may be broken into multiple stripe-level reclamation requests, potentially resulting in the issuance of thousands of reclamation requests. For example, a request to reclaim 1 GB of storage from a RAID 0/5/6/10 volume striped across five different disks using a stripe width of 64 KB may be broken into 3,276 separate reclamation requests of 64 KB in size ([(1 GB/64 KB)/5 disks)]=3,276) for each disk (or 16,380 total reclamation requests).

Processing such large numbers of stripe-level reclamation requests may consume an inordinate amount of system resources. Moreover, in the case of thin-provisioned storage, if the width of the stripes does not align with the allocation size of the thin-provisioned system, some storage may not be reclaimed. Accordingly, the instant disclosure identifies a need for systems and methods that efficiently reclaim storage space on striped volumes.

SUMMARY

As will be described in greater detail below, the instant disclosure generally relates to systems and methods for efficiently reclaiming storage space on striped volumes by dividing and coalescing storage reclamation requests on a per-device basis. In one example, the various systems described herein may accomplish this task by: 1) identifying a volume striped across a set of storage devices, 2) identifying a reclamation request to reclaim storage space allocated to the striped volume, and, for at least one device in the set of storage devices (e.g., for each device in the set of storage devices): 3) identifying the stripes of storage on the device that are covered by the reclamation request, 4) creating a consolidated reclamation request for the device that identifies each stripe of storage on the device that is covered by the reclamation request, and then 5) issuing the consolidated reclamation request to the device.

In some examples, the consolidated reclamation request may represent a single consolidated reclamation request (e.g., a single device-specific consolidated reclamation request). In other examples, the consolidated reclamation request may represent a plurality of (e.g., two or three) consolidated reclamation requests.

In some embodiments, identifying stripes of storage on the device that are covered by the reclamation request may include identifying, for each device in the set of storage devices, stripes of storage on the device that are covered by the reclamation request. In these embodiments, identifying stripes of storage on the device that are covered by the reclamation request may include mapping stripes of storage of the striped volume from the striped volume to the device.

In one example, creating the consolidated reclamation request may include creating a consolidated reclamation request for each device in the set of storage devices. In this example, creating a consolidated reclamation request for each device may include: 1) adding each stripe of storage on the device that is covered by the reclamation request to the consolidated reclamation request and then 2) increasing the length of the consolidated reclamation request.

In some examples, identifying a reclamation request to reclaim storage space allocated to the striped volume may include identifying a set of requests to reclaim storage space allocated to the striped volume. In these examples, identifying the set of requests to reclaim storage space allocated to the striped volume may include identifying a set of requests to reclaim stripes of storage. In some embodiments, the set of requests may originate from a single request. In addition, identifying the reclamation request to reclaim storage space allocated to the striped volume may include identifying a reclamation request to reclaim storage space from the entire striped volume and/or merely a portion of the striped volume.

In various embodiments, the striped volume may include a thin-provisioned volume striped across a set of storage devices. Upon creating the consolidated reclamation request, the various systems disclosed herein may reclaim the storage space in accordance with the consolidated reclamation request.

As will be explained below, by creating a consolidated reclamation request for each device within a set of storage devices used to house a striped volume, the systems and methods described herein may improve the efficiency of striped-volume reclamation operations by drastically reducing the number of reclamation requests issued. Moreover, in the case of thin-provisioned storage, the systems and methods described herein may ensure that the physical storage space on each device is fully reclaimed.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
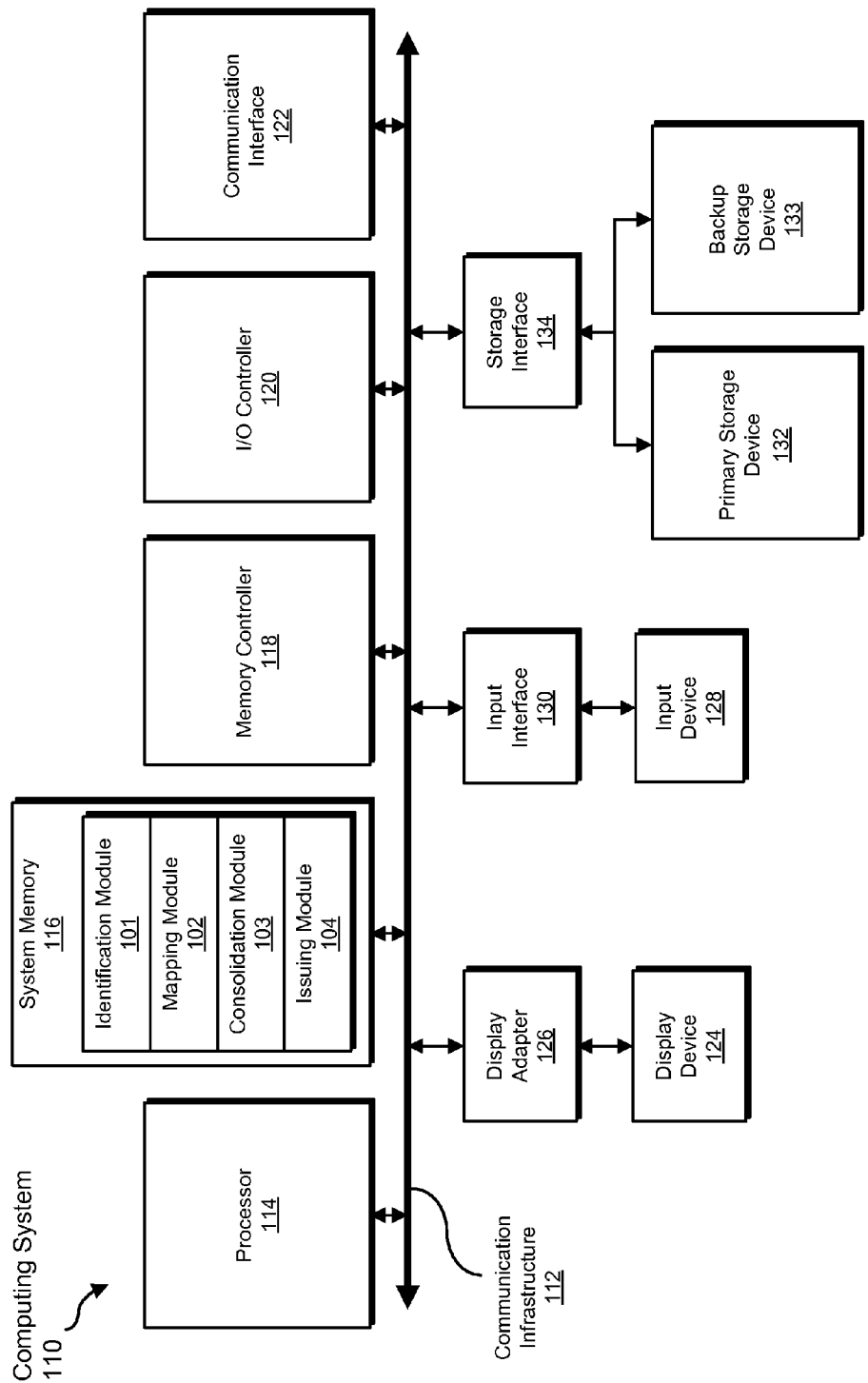
FIG. 1 is a block diagram of an exemplary computing system capable of implementing one or more of the embodiments described and/or illustrated herein.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for efficiently reclaiming storage space on striped volumes. As used herein, the term "striped volume" (or sometimes "volume striped across a set of storage devices") may refer to any volume, drive, or other allocation of storage space that includes non-contiguous storage space distributed across multiple storage devices.

Figure 2:
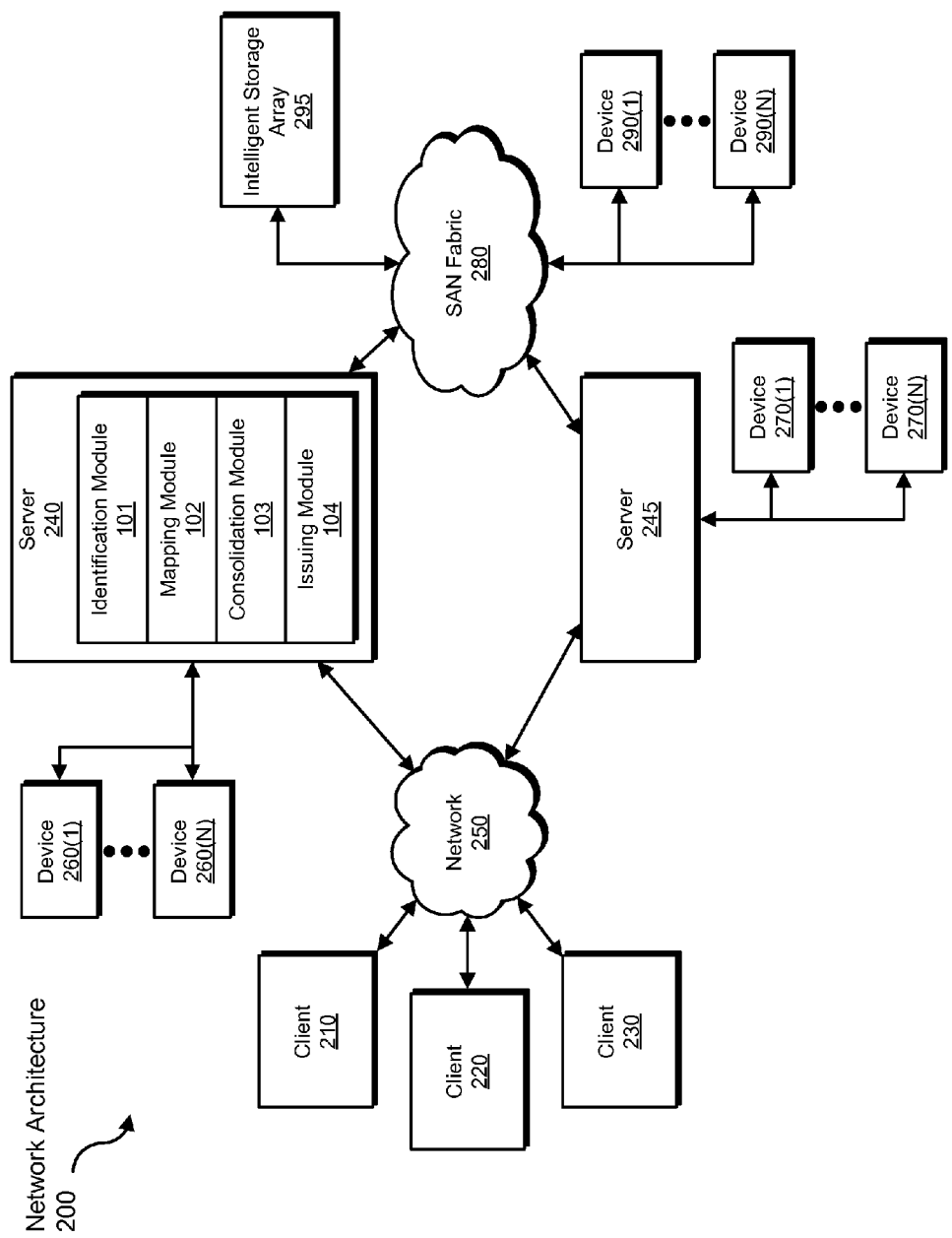
FIG. 2 is a block diagram of an exemplary computing network capable of implementing one or more of the embodiments described and/or illustrated herein.

The following will provide, with reference to FIGS. 1 and 2, detailed descriptions of an exemplary computing system and network architecture capable of implementing one or more of the embodiments described herein. In addition, detailed descriptions of exemplary systems for reclaiming storage space on striped volumes will be provided with reference to FIGS. 3, 4, and 6. Detailed descriptions of corresponding computer-implemented methods will also be provided in connection with FIG. 5.

FIG. 1 is a block diagram of an exemplary computing system 110 capable of implementing one or more of the embodiments described and/or illustrated herein. Computing system 110 broadly represents any single or multi-processor computing device or system capable of executing computer-readable instructions. Examples of computing system 110 include, without limitation, workstations, laptops, client-side terminals, servers, distributed computing systems, handheld devices, or any other computing system or device. In its most basic configuration, computing system 110 may include at least one processor 114 and a system memory 116.

Processor 114 generally represents any type or form of processing unit capable of processing data or interpreting and executing instructions. In certain embodiments, processor 114 may receive instructions from a software application or module. These instructions may cause processor 114 to perform the functions of one or more of the exemplary embodiments described and/or illustrated herein. For example, processor 114 may perform and/or be a means for performing, either alone or in combination with other elements, one or more of the identifying, creating, issuing, adding, increasing, and/or reclaiming steps described herein. Processor 114 may also perform and/or be a means for performing any other steps, methods, or processes described and/or illustrated herein.

System memory 116 generally represents any type or form of volatile or non-volatile storage device or medium capable of storing data and/or other computer-readable instructions. Examples of system memory 116 include, without limitation, random access memory (RAM), read only memory (ROM), flash memory, or any other suitable memory device. Although not required, in certain embodiments computing system 110 may include both a volatile memory unit (such as, for example, system memory 116) and a non-volatile storage device (such as, for example, primary storage device 132, as described in detail below). In one example, and as will be explained in greater detail below, one or more of modules 310 from FIG. 3 (e.g., identification module 101, mapping module 102, consolidation module 103, and issuing module 104) may be loaded into system memory 116.

In certain embodiments, exemplary computing system 110 may also include one or more components or elements in addition to processor 114 and system memory 116. For example, as illustrated in FIG. 1, computing system 110 may include a memory controller 118, an Input/Output (I/O) controller 120, and a communication interface 122, each of which may be interconnected via a communication infrastructure 112. Communication infrastructure 112 generally represents any type or form of infrastructure capable of facilitating communication between one or more components of a computing device. Examples of communication infrastructure 112 include, without limitation, a communication bus (such as an ISA, PCI, PCIe, or similar bus) and a network.

Memory controller 118 generally represents any type or form of device capable of handling memory or data or controlling communication between one or more components of computing system 110. For example, in certain embodiments memory controller 118 may control communication between processor 114, system memory 116, and I/O controller 120 via communication infrastructure 112. In certain embodiments, memory controller 118 may perform and/or be a means for performing, either alone or in combination with other elements, one or more of the steps or features described and/or illustrated herein, such as identifying, creating, issuing, adding, increasing, and/or reclaiming.

I/O controller 120 generally represents any type or form of module capable of coordinating and/or controlling the input and output functions of a computing device. For example, in certain embodiments I/O controller 120 may control or facilitate transfer of data between one or more elements of computing system 110, such as processor 114, system memory 116, communication interface 122, display adapter 126, input interface 130, and storage interface 134. I/O controller 120 may be used, for example, to perform and/or be a means for performing, either alone or in combination with other elements, one or more of the identifying, creating, issuing, adding, increasing, and/or reclaiming steps described herein. I/O controller 120 may also be used to perform and/or be a means for performing other steps and features set forth in the instant disclosure.

Communication interface 122 broadly represents any type or form of communication device or adapter capable of facilitating communication between exemplary computing system 110 and one or more additional devices. For example, in certain embodiments communication interface 122 may facilitate communication between computing system 110 and a private or public network including additional computing systems. Examples of communication interface 122 include, without limitation, a wired network interface (such as a network interface card), a wireless network interface (such as a wireless network interface card), a modem, and any other suitable interface. In at least one embodiment, communication interface 122 may provide a direct connection to a remote server via a direct link to a network, such as the Internet. Communication interface 122 may also indirectly provide such a connection through, for example, a local area network (such as an Ethernet network), a personal area network, a telephone or cable network, a cellular telephone connection, a satellite data connection, or any other suitable connection.

In certain embodiments, communication interface 122 may also represent a host adapter configured to facilitate communication between computing system 110 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 122 may also allow computing system 110 to engage in distributed or remote computing. For example, communication interface 122 may receive instructions from a remote device or send instructions to a remote device for execution. In certain embodiments, communication interface 122 may perform and/or be a means for performing, either alone or in combination with other elements, one or more of the identifying, creating, issuing, adding, increasing, and/or reclaiming steps disclosed herein. Communication interface 122 may also be used to perform and/or be a means for performing other steps and features set forth in the instant disclosure.

As illustrated in FIG. 1, computing system 110 may also include at least one display device 124 coupled to communication infrastructure 112 via a display adapter 126. Display device 124 generally represents any type or form of device capable of visually displaying information forwarded by display adapter 126. Similarly, display adapter 126 generally represents any type or form of device configured to forward graphics, text, and other data from communication infrastructure 112 (or from a frame buffer, as known in the art) for display on display device 124.

As illustrated in FIG. 1, exemplary computing system 110 may also include at least one input device 128 coupled to communication infrastructure 112 via an input interface 130. Input device 128 generally represents any type or form of input device capable of providing input, either computer or human generated, to exemplary computing system 110. Examples of input device 128 include, without limitation, a keyboard, a pointing device, a speech recognition device, or any other input device. In at least one embodiment, input device 128 may perform and/or be a means for performing, either alone or in combination with other elements, one or more of the identifying, creating, issuing, adding, increasing, and/or reclaiming steps disclosed herein. Input device 128 may also be used to perform and/or be a means for performing other steps and features set forth in the instant disclosure.

As illustrated in FIG. 1, exemplary computing system 110 may also include a primary storage device 132 and a backup storage device 133 coupled to communication infrastructure 112 via a storage interface 134. Storage devices 132 and 133 generally represent any type or form of storage device or medium capable of storing data and/or other computer-readable instructions. For example, storage devices 132 and 133 may be a magnetic disk drive (e.g., a so-called hard drive), a floppy disk drive, a magnetic tape drive, an optical disk drive, a flash drive, or the like. Storage interface 134 generally represents any type or form of interface or device for transferring data between storage devices 132 and 133 and other components of computing system 110.

In certain embodiments, storage devices 132 and 133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 132 and 133 may also include other similar structures or devices for allowing computer software, data, or other computer-readable instructions to be loaded into computing system 110. For example, storage devices 132 and 133 may be configured to read and write software, data, or other computer-readable information. Storage devices 132 and 133 may also be a part of computing system 110 or may be a separate device accessed through other interface systems.

In certain embodiments, storage devices 132 and 133 may be used, for example, to perform and/or be a means for performing, either alone or in combination with other elements, one or more of the identifying, creating, issuing, adding, increasing, and/or reclaiming steps disclosed herein. Storage devices 132 and 133 may also be used to perform and/or be a means for performing other steps and features set forth in the instant disclosure.

Many other devices or subsystems may be connected to computing system 110. Conversely, all of the components and devices illustrated in FIG. 1 need not be present to practice the embodiments described and/or illustrated herein. The devices and subsystems referenced above may also be interconnected in different ways from that shown in FIG. 1. Computing system 110 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 110. All or a portion of the computer program stored on the computer-readable medium may then be stored in system memory 116 and/or various portions of storage devices 132 and 133. When executed by processor 114, a computer program loaded into computing system 110 may cause processor 114 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 110 may be configured as an application specific integrated circuit (ASIC) adapted to implement one or more of the exemplary embodiments disclosed herein.

FIG. 2 is a block diagram of an exemplary network architecture 200 in which client systems 210, 220, and 230 and servers 240 and 245 may be coupled to a network 250. Client systems 210, 220, and 230 generally represent any type or form of computing device or system, such as exemplary computing system 110 in FIG. 1.

Similarly, servers 240 and 245 generally represent computing devices or systems, such as application servers or database servers, configured to provide various database services and/or run certain software applications. In one example, and as will be explained in greater detail below, server 240 may include system 300 (e.g., identification module 101, mapping module 10, consolidation module 103, and issuing module 104) from FIG. 3.

Network 250 generally represents any telecommunication or computer network including, for example, an intranet, a wide area network (WAN), a local area network (LAN), a personal area network (PAN), or the Internet.

As illustrated in FIG. 2, one or more storage devices 260(1)-(N) may be directly attached to server 240. Similarly, one or more storage devices 270(1)-(N) may be directly attached to server 245. Storage devices 260(1)-(N) and storage devices 270(1)-(N) generally represent any type or form of storage device or medium capable of storing data and/or other computer-readable instructions. In certain embodiments, storage devices 260(1)-(N) and storage devices 270(1)-(N) may represent network-attached storage (NAS) devices configured to communicate with servers 240 and 245 using various protocols, such as NFS, SMB, or CIFS.

Servers 240 and 245 may also be connected to a storage area network (SAN) fabric 280. SAN fabric 280 generally represents any type or form of computer network or architecture capable of facilitating communication between a plurality of storage devices. SAN fabric 280 may facilitate communication between servers 240 and 245 and a plurality of storage devices 290(1)-(N) and/or an intelligent storage array 295. SAN fabric 280 may also facilitate, via network 250 and servers 240 and 245, communication between client systems 210, 220, and 230 and storage devices 290(1)-(N) and/or intelligent storage array 295 in such a manner that devices 290(1)-(N) and array 295 appear as locally attached devices to client systems 210, 220, and 230. As with storage devices 260(1)-(N) and storage devices 270(1)-(N), storage devices 290(1)-(N) and intelligent storage array 295 generally represent any type or form of storage device or medium capable of storing data and/or other computer-readable instructions.

In certain embodiments, and with reference to exemplary computing system 110 of FIG. 1, a communication interface, such as communication interface 122 in FIG. 1, may be used to provide connectivity between each client system 210, 220, and 230 and network 250. Client systems 210, 220, and 230 may be able to access information on server 240 or 245 using, for example, a web browser or other client software. Such software may allow client systems 210, 220, and 230 to access data hosted by server 240, server 245, storage devices 260(1)-(N), storage devices 270(1)-(N), storage devices 290 (1)-(N), or intelligent storage array 295. Although FIG. 2 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 240, server 245, storage devices 260(1)-(N), storage devices 270(1)-(N), storage devices 290(1)-(N), intelligent storage array 295, or any combination thereof. All or a portion of one or more of the exemplary embodiments disclosed herein may also be encoded as a computer program, stored in server 240, run by server 245, and distributed to client systems 210, 220, and 230 over network 250. Accordingly, network architecture 200 may perform and/or be a means for performing, either alone or in combination with other elements, one or more of the identifying, creating, issuing, adding, increasing, and/or reclaiming steps disclosed herein. Network architecture 200 may also be used to perform and/or be a means for performing other steps and features set forth in the instant disclosure.

As detailed above, computing system 110 and/or one or more components of network architecture 200 may perform and/or be a means for performing, either alone or in combination with other elements, one or more steps of an exemplary method for reclaiming storage space on striped volumes.

Figure 3:
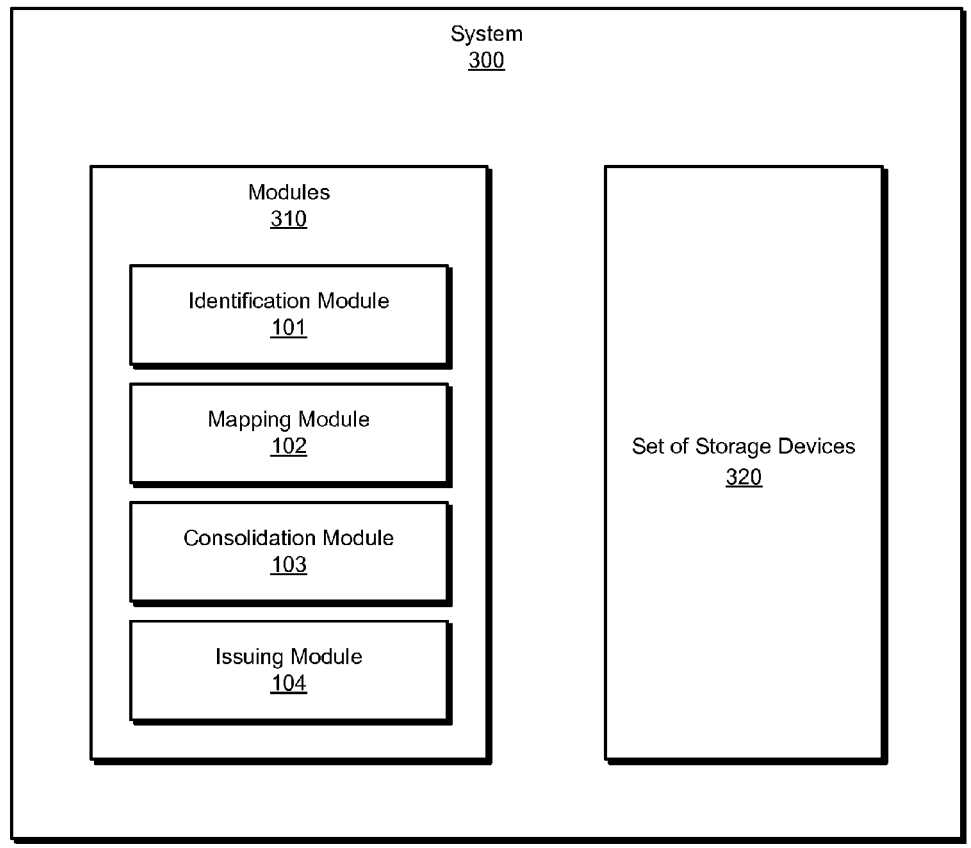
FIG. 3 is a block diagram of an exemplary system for reclaiming storage space on striped volumes.

FIG. 3 is a block diagram of an exemplary system 300 for reclaiming storage space on striped volumes. As illustrated in this figure, exemplary system 300 may include one or more modules 310 for performing one or more tasks. For example, and as will be explained in greater detail below, exemplary system 300 may include an identification module 101 programmed to identify: 1) a volume striped across a set of storage devices and 2) a reclamation request to reclaim storage space allocated to the striped volume. Exemplary system 300 may also include a mapping module 102 programmed to identify, for at least one device in the set of storage devices, stripes of storage on the device that are covered by the reclamation request.

In addition, and as will be described in greater detail below, exemplary system 300 may include a consolidation module 103 programmed to create a consolidated reclamation request for the device. The consolidated reclamation request may identify each stripe of storage on the device that is covered by the reclamation request. Exemplary system 300 may further include an issuing module 104 programmed to issue the consolidated reclamation request. Although illustrated as separate elements, one or more of modules 310 in FIG. 3 may represent portions of a single module or application.

In certain embodiments, one or more of modules 310 in FIG. 3 may represent one or more software applications or programs that, when executed by a computing device, may cause the computing device to perform one or more tasks. For example, as will be described in greater detail below, one or more of modules 310 may represent software modules stored and configured to run on one or more computing devices, such as the devices illustrated in FIG. 4 (e.g., computing system 402), computing system 110 in FIG. 1, and/or portions of exemplary network architecture 200 in FIG. 2. One or more of modules 310 in FIG. 3 may also represent all or portions of one or more special-purpose computers configured to perform one or more tasks.

As illustrated in FIG. 3, exemplary system 300 may also include a set of storage devices 320. Storage devices 320 may represent a portion of one or more computing devices. For example, storage devices 320 may represent a portion of computing system 402 in FIG. 4, computing system 110 in FIG. 1, and/or portions of exemplary network architecture 200 in FIG. 2. Alternatively, storage devices 320 in FIG. 3 may represent one or more physically separate devices capable of being accessed by a computing device, such as computing system 402 in FIG. 4, computing system 110 in FIG. 1, and/or portions of exemplary network architecture 200 in FIG. 2.

Figure 4:
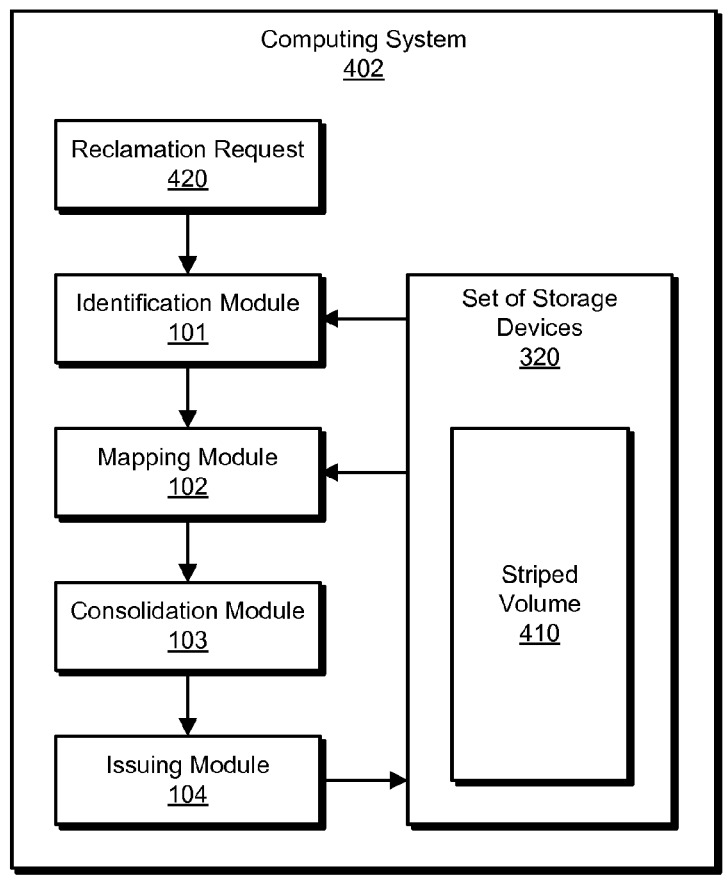
FIG. 4 is a block diagram of an exemplary system for reclaiming storage space on striped volumes.

Exemplary system 300 in FIG. 3 may be deployed in a variety of ways. For example, all or a portion of exemplary system 300 may represent portions of system 400 illustrated in FIG. 4. As shown in FIG. 4, system 400 may include a computing system 402. In one embodiment, and as will be described in greater detail below, computing system 402 may be programmed to issue consolidated reclamation requests for striped volumes.

For example, computing system 402 may be programmed with identification module 101, mapping module 102, consolidation module 103, and issuing module 104 from FIG. 1. In this example, and as will be described in greater detail below, identification module 101 may identify a volume striped across a set of storage devices (e.g., identification module 101 may identify a striped volume 410 striped across storage devices 320). Identification module 101 may also identify a reclamation request (e.g., reclamation request 420) to reclaim storage space allocated to striped volume 410.

Mapping module 102 may then, for at least on device within the set of storage devices, identify stripes of storage on the device that are covered by the reclamation request (e.g., mapping module 102 may identify stripes of storage covered by reclamation request 420 for each device in the set of storage devices 320). Consolidation module 103 may then create a consolidated reclamation request for the identified device. The consolidated reclamation request (which may, as detailed above, represent a single or a plurality, such as two or three, consolidation requests) may identify each stripe of storage on the device that is covered by the reclamation request. Issuing module 104 may then issue the consolidated reclamation request (e.g., to the identified device within storage devices 320).

Computing system 402 generally represents any type or form of computing device capable of reading computer-executable instructions. Examples of computing system 402 include, without limitation, laptops, desktops, servers, cellular phones, personal digital assistants (PDAs), multimedia players, embedded systems, combinations of one or more of the same, exemplary computing system 110 in FIG. 1, or any other suitable computing device.

Figure 5:
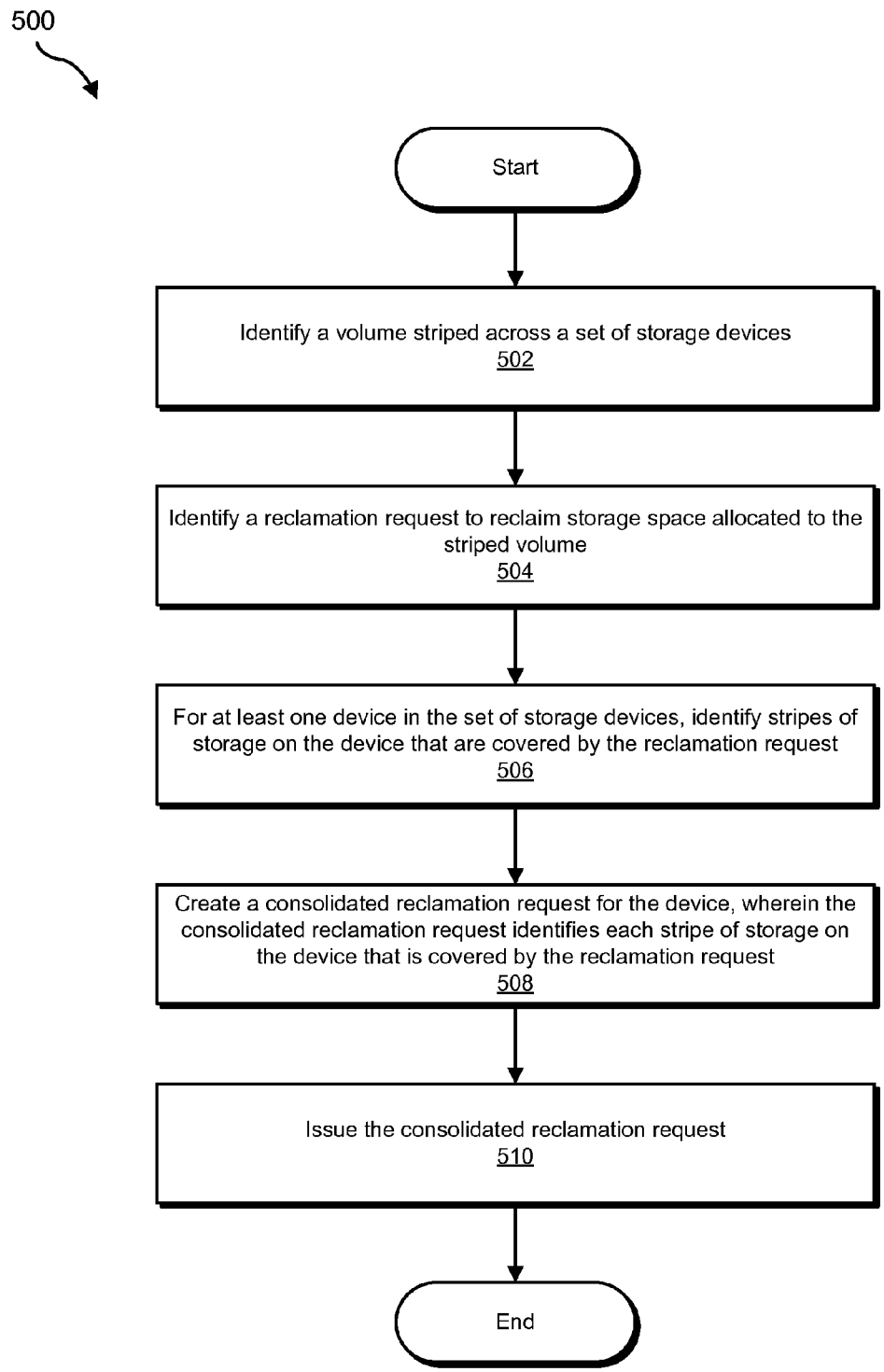
FIG. 5 is a flow diagram of an exemplary method for reclaiming storage space on striped volumes.

FIG. 5 is a flow diagram of an exemplary computer-implemented method 500 for reclaiming storage space on striped volumes. The steps shown in FIG. 5 may be performed by any suitable computer-executable code and/or computing system. In some embodiments, the steps shown in FIG. 5 may be performed by one or more of the components of system 300 in FIG. 3 and/or system 400 in FIG. 4.

As illustrated in FIG. 5, at step 502 one or more of the systems described herein may identify a volume striped across a set of storage devices. For example, at step 502 identification module 101 in FIG. 3 may, as part of computing system 402 in FIG. 4, identify a striped volume 410 striped across a set of storage devices 320 in FIG. 4. As detailed above, the term "striped volume" (or sometimes "volume striped across a set of storage devices") may refer to any volume, drive, or other allocation of storage space that includes non-contiguous storage space distributed across multiple storage devices.

Identification module 101 may identify the volume striped across the set of storage devices in any suitable manner. For example, identification module 101 may identify the striped volume by reading a configuration file associated with the striped volume. Additionally or alternatively, identification module 101 may identify the striped volume by identifying (e.g., intercepting, receiving, or retrieving) a reclamation request pertaining to the striped volume.

According to some embodiments, the striped volume identified by identification module 101 may represent a thin-provisioned volume striped across a set of storage devices. As used herein, the phrase "thin-provisioned volume" may refer to a volume for which storage space is allocated on an as-needed and/or just-in-time basis.

Returning to FIG. 5, at step 504 one or more of the systems described herein may identify a reclamation request to reclaim storage space allocated to the striped volume. For example, at step 504 identification module 101 in FIG. 3 may, as part of computing system 402 in FIG. 4, identify or intercept a reclamation request 420 to reclaim storage space allocated to striped volume 410. As used herein, the phrase "reclamation request" may refer to any request, message, communication, instruction, and/or attempt to reclaim storage space allocated to a volume.

Identification module 101 may identify the reclamation request in a variety of contexts. For example, identification module 101 may identify the reclamation request before the reclamation request is divided into smaller (e.g., stripe-level) requests. In this example, identification module 101 may identify the reclamation request simply by monitoring for such requests (e.g., as part of a file system driver). Additionally or alternatively, identification module 101 may identify the reclamation request by intercepting the reclamation request, thereby preventing the division of the reclamation request into stripe-sized reclamation requests.

In another context, identification module 101 may identify the reclamation request after the reclamation request has been divided into several smaller requests. For example, in some embodiments, identification module 101 may identify the reclamation request by identifying a set of requests to reclaim storage space allocated to the striped volume. In some cases, identification module 101 may identify the set of requests to reclaim storage space allocated to the striped volume by identifying a set of requests to reclaim stripes of storage (e.g., by identifying a set of stripe-sized reclamation requests). As used herein, the term "stripe" or "stripe of storage" may refer to a contiguous chunk of storage space on a storage device that has been allocated to a striped volume.

As an example of how identification module 101 may identify a reclamation request broken into a set of reclamation requests of stripe-width size, identification module 101 may identify a reclamation request pertaining to a volume striped across an array of storage devices (such as a RAID 0, RAID 5, RAID 6, or RAID 10 configuration). A file system administering the volume may divide the reclamation request into a set of stripe-width reclamation requests. For example, the reclamation request may represent a request to reclaim 1 gigabyte of storage from a striped volume having a stripe width of 64 kilobytes. The RAID configuration may include five storage disks. In this example, the reclamation request may be divided into 16,380 stripe-width reclamation requests (3,276 requests for each disk).

In the context of the above example, identification module 101 may identify the original 1 gigabyte reclamation request: 1) before it is divided into the 16,380 separate requests, 2) after it is divided into the 16,380 requests, or 3) during the division. For example, identification module 101 may intercept the original reclamation request before it is divided, thereby preempting the division of the original reclamation request. Alternatively, identification module 101 may identify the original reclamation request after it has been divided so as to not interfere with the division of the original reclamation request.

In some embodiments, the reclamation request may include a reclamation request to reclaim storage space from the entire striped volume. In other embodiments, the reclamation request may include a reclamation request to reclaim storage space from a portion of the striped volume.

Returning to FIG. 5, at step 506 one or more of the systems described herein may, for at least one device in the set of storage devices, identify stripes of storage on the device that are covered by the reclamation request. For example, at step 506 mapping module 102 in FIG. 3 may, as part of computing system 402 in FIG. 4, identify, for each of storage devices 320, stripes of storage on the device that are covered by reclamation request 420.

Mapping module 102 may identify the stripes of storage on the device that are covered by the reclamation request in step 506 in any suitable manner. For example, mapping module 102 may identify the stripes of storage on the device that are covered by the reclamation request by mapping stripes of storage of the striped volume from the striped volume to the device. In this manner, mapping module 102 may match volume stripes to physical locations.

In some embodiments, mapping module 102 may identify, for each device in the set of storage devices, stripes of storage on the device that are covered by the reclamation request. As will be described below, this may allow the consolidation module to create a consolidated reclamation request for each device.

Returning to FIG. 5, at step 508 one or more of the systems described herein may create a consolidated reclamation request for the device that identifies each stripe of storage on the device that is covered by the reclamation request. For example, consolidation module 103 in FIG. 3 may, as part of computing system 402 in FIG. 4, create a consolidated reclamation request for each of storage devices 320.

As used herein, the phrase "consolidated reclamation request" may refer to any reclamation request that has been consolidated in some form on a per-device basis in order to reclaim stripes of storage from the device. In some examples, this consolidated reclamation request may represent a single consolidated reclamation request (e.g., a single reclamation request for each device). In other examples, the consolidated reclamation request may represent a plurality of consolidated reclamation requests (e.g., more than one reclamation request for each device, but fewer than the number of requests that would have issued without consolidating the same).

Consolidation module 103 may create the consolidated reclamation request for the device in any suitable manner. For example, consolidation module 103 may add each stripe of storage on the device that is covered by the reclamation request to the consolidated reclamation request (e.g., based on the stripes of storage identified by mapping module 102). In some embodiments, consolidation module 103 may accordingly increase the length of the consolidated reclamation request based on the number and size of stripes added to the consolidated reclamation request.

As mentioned above, mapping module 102 may identify the stripes of storage covered by the reclamation request for each device. Likewise, consolidation module 103 may create a consolidated reclamation request for each device in the set of storage devices. Accordingly, the number of consolidated reclamation requests necessary to completely replace the original reclamation request may be as low as the number of devices in the set of storage devices.

Returning to FIG. 5, at step 510 one or more of the systems described herein may issue the consolidated reclamation request. For example, issuing module 104 in FIG. 3 may, as part of computing system 402 in FIG. 4, issue a device-specific consolidated reclamation request to each of storage device 320.

Issuing module 104 may issue the consolidated reclamation request in any suitable manner. For example, issuing module 104 may issue the consolidated reclamation request by issuing the request to a corresponding device. In some embodiments, issuing module 104 may issue a consolidated device-specific reclamation request to each device in the set of storage devices. In some embodiments, one or more of the systems described herein may, upon issuing the consolidated reclamation request(s), reclaim the storage space identified in the requests in accordance with each consolidated reclamation request. Upon completing step 510, the method of FIG. 5 may terminate.

Figure 6:
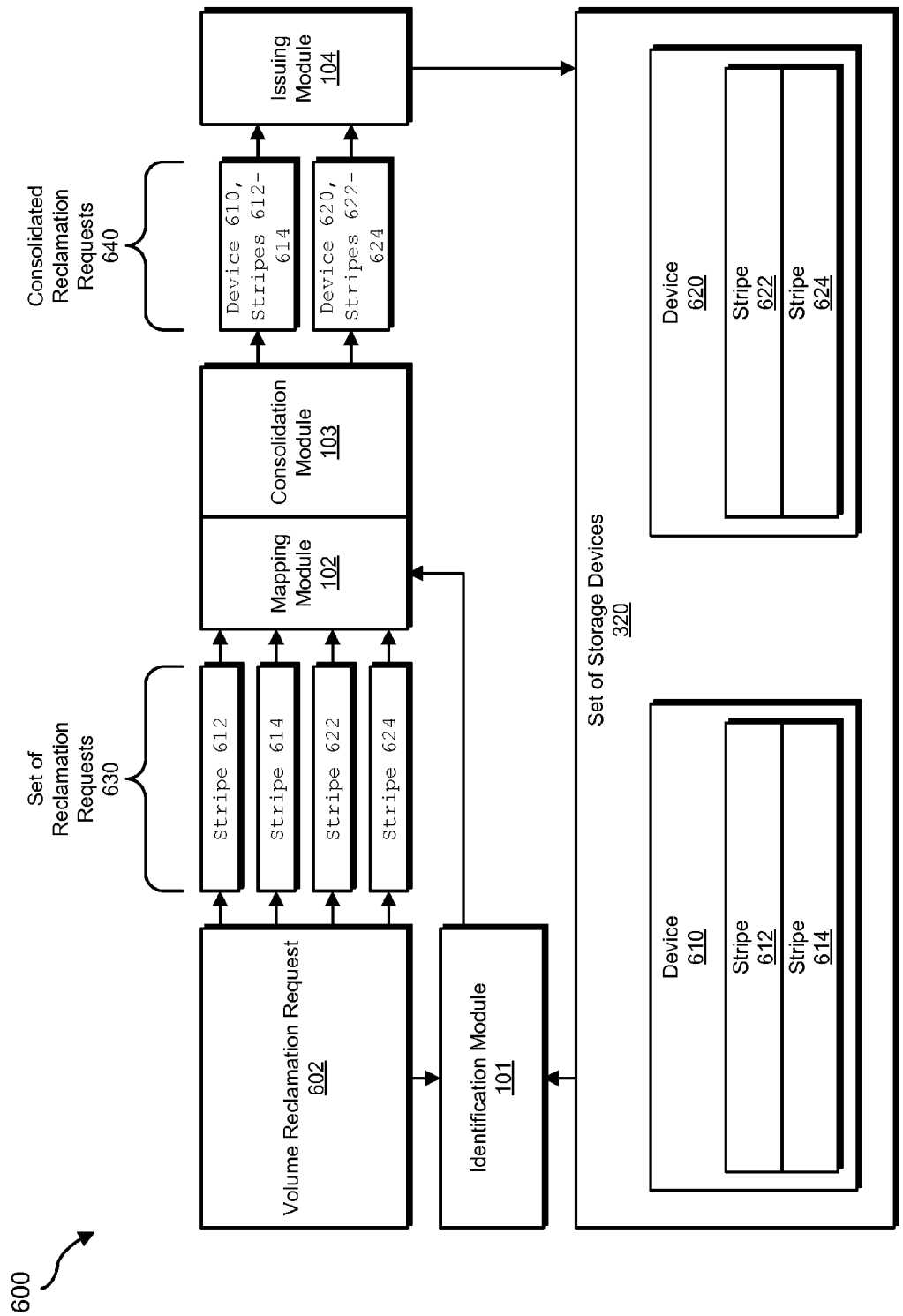
FIG. 6 is a block diagram of an exemplary system for reclaiming storage space on striped volumes.

For illustrative purposes, and by way of example only, FIG. 6 shows a system 600 for reclaiming storage space on striped volumes. As shown in FIG. 6, storage devices 320 may include two storage devices: device 610 and device 620. Device 610 may include two stripes of a striped volume (stripe 612 and stripe 614), while device 620 may include two stripes of the striped volume (stripe 622 and stripe 624).

In this example, identification module 101 may identify a volume reclamation request 602 for a volume striped across storage devices 320. As illustrated in FIG. 6, volume reclamation request 602 may include a set of four reclamation requests 630 to reclaim stripes 612, 614, 622, and 624. Without the intervention of modules 101-104, system 600 may ordinarily need to issue four reclamation requests in order to reclaim all of the storage space from the striped volume.

However, in this example mapping module 102 may intercept and identify the involved stripes (i.e., stripes 612, 614, 622, and 624) and determine their respective locations or positions on storage devices 320. Consolidation module 103 may then consolidate what would be four reclamation requests into two (e.g., consolidated reclamation requests 640)—one for each device. Issuing module 104 may then issue consolidated reclamation requests 640 to device 610 and device 620, respectively.

As detailed above, by creating a consolidated reclamation request for each device within a set of storage devices used to house a striped volume, the systems and methods described herein may improve the efficiency of striped-volume reclamation operations by drastically reducing the number of reclamation requests issued. Moreover, in the case of thin-provisioned storage, the systems and methods described herein may ensure that the physical storage space on each device is fully reclaimed.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of the exemplary systems described herein may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a set of reclamation requests into one or more consolidated reclamation requests. Furthermore, one or more of the modules described herein may transform a computing system into an efficient reclamation device of storage space on striped volumes.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for reclaiming storage space on striped volumes, at least a portion of the method being performed by a computing device comprising at least one processor, the method comprising:
    identifying a volume striped across a set of storage devices;
    identifying a reclamation request to reclaim storage space allocated to the striped volume;
    identifying stripes of storage on the set of storage devices that are covered by the reclamation request;
    identifying a plurality of smaller reclamation requests that are required to reclaim the stripes of storage on the set of storage devices that are covered by the reclamation request;
    consolidating the plurality of smaller reclamation requests into a plurality of consolidated reclamation requests, wherein each consolidated reclamation request within the plurality of consolidated reclamation requests identifies, for a single storage device within the set of storage devices, each stripe of storage on the storage device that is covered by the reclamation request;
    issuing the plurality of consolidated reclamation requests to the set of storage devices.

2. The computer-implemented method of claim 1, wherein identifying the plurality of smaller reclamation requests comprises at least one of:
    identifying the plurality of smaller reclamation requests before the reclamation request is divided into the plurality of smaller reclamation requests;
    identifying the plurality of smaller reclamation requests after the reclamation request has been divided into the plurality of smaller reclamation requests;
    identifying the plurality of smaller reclamation requests as the reclamation request is divided into the plurality of smaller reclamation requests.

3. The computer-implemented method of claim 1, wherein the plurality of smaller reclamation requests comprise a plurality of stripe-sized reclamation requests.

4. The computer-implemented method of claim 1, wherein consolidating the plurality of smaller reclamation requests into the plurality of consolidated reclamation requests comprises:
    identifying the plurality of smaller reclamation requests for the storage device within the set of storage devices and at least one other plurality of smaller reclamation requests for at least one other storage device within the set of storage devices;
    reducing the plurality of smaller reclamation requests for the storage device within the set of storage devices into a consolidated reclamation request for the storage device within the set of storage devices;
    reducing the other plurality of smaller reclamation requests for the other storage device within the set of storage devices into at least one other consolidated reclamation request for the other storage device within the set of storage devices.

5. The computer-implemented method of claim 4, wherein issuing the plurality of consolidated reclamation requests to the set of storage devices comprises:
    issuing the consolidated reclamation request to the storage device within the set of storage devices;
    issuing the other consolidated reclamation request to the other storage device within the set of storage devices.

6. The computer-implemented method of claim 1, wherein consolidating the plurality of smaller reclamation requests into the plurality of consolidated reclamation requests comprises reducing a greater number of smaller reclamation requests into a lesser number of consolidated reclamation requests, wherein the lesser number of consolidated reclamation requests comprises a consolidated reclamation request for each storage device within the set of storage devices.

7. The computer-implemented method of claim 1, wherein identifying the stripes of storage on the set of devices that are covered by the reclamation request comprises mapping stripes of storage of the striped volume from the striped volume to each device within the set of storage devices.

8. The computer-implemented method of claim 1, wherein consolidating the plurality of smaller reclamation requests into the plurality of consolidated reclamation requests comprises:
    adding each stripe of storage covered by the reclamation request to the plurality of consolidated reclamation requests;
    increasing the number of bytes covered by the plurality of consolidated reclamation requests.

9. The computer-implemented method of claim 1, wherein each consolidated reclamation request within the plurality of consolidated reclamation requests comprises at least one of:
    a single consolidated reclamation request;
    a lesser number of reclamation requests than the plurality of smaller reclamation requests.

10. The computer-implemented method of claim 1, further comprising reclaiming the storage space in accordance with the plurality of consolidated reclamation requests.

11. The computer-implemented method of claim 1, wherein the striped volume comprises a thin-provisioned volume striped across the set of storage devices.

12. The computer-implemented method of claim 1, wherein the reclamation request comprises:
    a reclamation request to reclaim storage space from the entire striped volume; or
    a reclamation request to reclaim storage space from a portion of the striped volume.

13. The computer-implemented method of claim 1, wherein consolidating the plurality of smaller reclamation requests into the plurality of consolidated reclamation requests comprises consolidating the plurality of smaller reclamation requests on a per-device basis.

14. The computer-implemented method of claim 1, wherein the plurality of consolidated reclamation requests comprise:

a consolidated reclamation request specific to the storage device within the set of storage devices;

at least one other consolidated reclamation request specific to at least one other storage device within the set of storage devices.

15. The computer-implemented method of claim 1, wherein the plurality of consolidated reclamation requests comprise a plurality of device-specific consolidated reclamation requests.

16. A system for reclaiming storage space on striped volumes, the system comprising:

an identification module programmed to:

identify a volume striped across a set of storage devices;

identify a reclamation request to reclaim storage space allocated to the striped volume;

a mapping module programmed to:

identify stripes of storage on the set of storage devices that are covered by the reclamation request;

identify a plurality of smaller reclamation requests that are required to reclaim the stripes of storage on the set of storage devices that are covered by the reclamation request;

a consolidation module programmed to consolidate the plurality of smaller reclamation requests into a plurality of consolidated reclamation requests, wherein each consolidated reclamation request within the plurality of consolidated reclamation requests identifies, for a single storage device within the set of storage devices, each stripe of storage on the storage device that is covered by the reclamation request;

an issuing module programmed to issue the plurality of consolidated reclamation requests to the set of storage devices;

at least one hardware processor configured to execute the identification module, the mapping module, the consolidation module, and the issuing module.

17. The system of claim 16, wherein the mapping module is programmed to identify the plurality of smaller reclamation requests by at least one of:

identifying the plurality of smaller reclamation requests before the reclamation request is divided into the plurality of smaller reclamation requests;

identifying the plurality of smaller reclamation requests after the reclamation request has been divided into the plurality of smaller reclamation requests;

identifying the plurality of smaller reclamation requests as the reclamation request is divided into the plurality of smaller reclamation requests.

18. The system of claim 16, wherein the plurality of smaller reclamation requests comprise a plurality of stripe-sized reclamation requests.

19. The system of claim 16, wherein the mapping module is programmed to identify the stripes of storage on the set of storage devices that are covered by the reclamation request by mapping stripes of storage of the striped volume from the striped volume to each device within the set of storage devices.

20. A non-transitory computer-readable-storage medium comprising one or more computer-executable instructions that, when executed by at least one processor of a computing device, cause the computing device to:

identify a volume striped across a set of storage devices;

identify a reclamation request to reclaim storage space allocated to the striped volume;

identify stripes of storage on the set of storage device that are covered by the reclamation request;

identify a plurality of smaller reclamation requests that are required to reclaim the stripes of storage on the set of storage devices that are covered by the reclamation request;

consolidate the plurality of smaller reclamation requests into a plurality of consolidated reclamation requests, wherein each consolidated reclamation request within the plurality of consolidated reclamation requests identifies, for a single storage device within the set of storage devices, each stripe of storage on the storage device that is covered by the reclamation request;

issue the plurality of consolidated reclamation requests to the set of storage devices.

\* \* \* \* \*